United States Patent

[11] 3,567,138

| [72] | Inventor | David P. Fields |
| | | Wilmington, Del. |
| [21] | Appl. No. | 703,899 |
| [22] | Filed | Feb. 8, 1968 |
| [45] | Patented | Mar. 2, 1971 |
| [73] | Assignee | E. I. Du Pont de Nemours and Company |
| | | Wilmington, Del. |

[54] USE OF SCREENING FOLLOWING MICRONIZING TO IMPROVE TIO$_2$ DISPERSIBILITY
2 Claims, No Drawings

[52] U.S. Cl.......................................................... 241/5,
  106/300, 241/29
[51] Int. Cl.......................................................... B02c 13/00,
  B02c 19/06, B02c 19/12
[50] Field of Search............................................. 241/1, 5,
  24, 29, 85, 90, 91; 106/300, 308 (I)

[56] References Cited
UNITED STATES PATENTS

| 2,214,815 | 9/1940 | Hanahan | 241/29 |
| 2,346,085 | 4/1944 | Sawyer | 241/29x |
| 2,737,460 | 3/1956 | Werner | 106/300 |
| 2,744,029 | 5/1956 | Kingsbury | 106/300 |
| 2,886,254 | 5/1959 | Rohlinger | 241/86x |
| 3,015,573 | 1/1962 | Myers | 106/300 |
| 3,380,665 | 4/1968 | Jester | 241/29x |
| 3,412,944 | 11/1968 | Wollenberg | 241/5 |

*Primary Examiner*—Donald G. Kelly
*Attorney*—Frank R. Ortolani

ABSTRACT: TiO$_2$ pigments are specially prepared to give them ease of dispersion in organic media, especially plastics, by subjecting the dry pigment to fluid energy milling and then forcing the milled product through a screen.

USE OF SCREENING FOLLOWING MICRONIZING TO IMPROVE TIO₂ DISPERSIBILITY

BACKGROUND OF THE INVENTION

Titanium dioxide pigments are made commercially by both the hydrolytic decomposition of sulfuric acid solution of titaniferous materials followed by washing and calcination and by the newer vapor phase oxidation of titanium tetrachloride. Both products may be treated by precipitation thereon of hydrous oxides of silicon, aluminum, titanium and the like. Such pigments are dispersed in various media or binders to form coatings or pigmented plastic articles. For the pigment to perform effectively its individual particles should be less than about .3 micron in diameter and should be well dispersed in the medium. The reaction conditions of both process have been quite well perfected so that the ultimate crystalline particles, rutile or anatase, are near the desired size. Unfortunately it has been impossible to avoid the occurrence of aggregates which are difficult to disperse. It is customary therefore to subject these pigments to a grinding step. Dry grinding is preferred for reasons of economy and fluid energy milling has become an important dry grinding method. Suitable processes and equipment for high, fluid energy milling are taught in U.S. Pat. No. 2,032,827 and U.S. Pat. No. 3,178,121. The high energy supplied to the vortex in these mills, known as "micronizers", is such that a large portion of the aggregates are disintegrated. It has been found, however, that, as the energy input of the fluid milling is increased there is a decrease in dispersibility of the particles on mixing into plastics, for example. The particles tend to cluster, usually in streaks in the medium, decreasing their pigmentary efficiency and giving undesired optical effects.

SUMMARY OF THE INVENTION

According to this invention the dried pigment containing aggregates is subjected to fluid energy milling, preferably of the high energy vortex type such as that described in U.S. Pat. No. 3,178,121 to obtain a minimum content of aggregates. This product is then subjected to a screening step which consists of forcing the pigment through a foraminous member or sheet having holes therein ranging from 0.25 to 2.5 millimeters in diameter. Simple hand rubbing of the pigment in the usual dry state through the screen suffices to markedly increase the dispersibility in a plastic medium. For commercial production, a mechanical screening or sieving device is used such as a "mikropulverizer", which consists essentially of members, which are rotatable inside a shell at least a portion of which shell is provided with holes or slots of the desired size. The pigment is fed to the inside of the shell and is forced by the rotating members to exit through the screen. Devices are preferred which provide a wiping action to rub the pigment through the screen. The screen-hammer mills such as the "Mikro-Pulverizer hammer mill" and the "Mikro-Pulverizer", manufactured by the Pulverizing Machinery Company of Summit, N.J., the "Raymond Screen Pulverizer" and similar mills described in Section 8, pages 32—35 (FIGS. 8—37) of Perry's Chemical Engineers' Handbook, fourth edition (McGraw-Hill) illustrate useful devices. The screened pigment shows an improvement in dispersibility as compared to the fluid energy milled product. The process is applicable to all titanium dioxide pigments including those which have been surface treated with the hydrous oxides of aluminum, silicon, titanium and the like.

DISPERSION TEST

The following test is employed in the example in rating the dispersibility of the various products: 5 grams of pigment are dry blended into 150 grams of a medium hard vinyl masterbatch containing 100 parts of polyvinyl chloride, 0.25 parts of stearic acid, 45 parts of dioctyl phthalate as a plasticizer, 5 parts of epoxidized soya oil and 3 parts of a Ba, Cd, Zn containing stabilizer ("Q 189B" sold by Argus Chemical Company, Brooklyn, N.Y.), on a change-can mixer for 5 minutes. This mixture is then milled on the two roll mill with the nip between the rolls set at 25 mils and the roll speed for both rolls set at 15 feet per minute. The temperature of the rolls is 305° ± 5° F. At the beginning of the test the masterbatch-pigment mixture is poured into the nip and the vinyl is allowed to band for one minute. At the end of this first minute all the scraps which have fallen through the rolls are put back into the nip. The whole sheet is then completely removed from the mill, rolled by hand into a cigar shape and then placed back into the nip and allowed to band for another minute. The sheet is then removed and evaluated for streaking. Sections of the sheet 8 × 11 inches are cut for visual examination against standards prepared using a wide variety of pigments to obtain a set of chips to represent a scale of 10 steps, a rating of "10" indicating nearly perfect dispersion with no streaks or agglomeration of the pigment and a rating of "1" indicating the poorest in which much of the pigment appears agglomerated and streaked.

The following example is intended to illustrate the invention. It is not intended to limit it in any manner.

EXAMPLE 1

Titanium dioxide containing 1 percent of $Al_2O_3$ imparted by cooxidation of $TiCl_4$ and $AlCl_3$ in the presence of water vapor and potassium ions as described in U.S. Pats. Nos. 2,488,440, 2,559,638, and 3,208,866 and calcined in a direct fired kiln at 550° C. is ground in an 8-inch micronizer with .056 weight percent of triethanolamine as a grinding aid, the pigment being fed at 400 gm/min. and the weight ratio of steam to pigment used being 5.8. The micronized pigment is then passed once through a "Milropulverizer" having a metal sheet screen with three thirty-seconds inch (2.37 mm.) diameter holes. The pigment is tested for dispersion in a vinyl plastic as described above.

| Sample | Dispersion Rating |
|---|---|
| Micronized only | 4 |
| Micronized and "Milropulverized" 10 | 6 |

EXAMPLE 2

A rutile base pigment made by the vapor phase oxidation of $TiCl_4$ and recalcined to remove adsorbed chlorine, is ground in a high energy steam "micronizer" of the type described in U.S. Pat. No. 3,178,121, with steam at b 275° C. supplied tangentially to the vortex through supersonic nozzles at the rate of 3 pounds steam per pound of pigment. Samples of this product are separately passed through a Mikropulverizer equipped at different times as shown with screens having holes of one-sixteenth inch (1.59 mm.) and one thirty-seconds inch (0.79 mm.). Other portions similarly dried are hand rubbed with a soft rubber blade through 14, 20 and 30 mesh Tyler screens (having openings of 1.16 mm, 0.83 mm., and 0.54 mm., respectively). All products are tested for dispersibility according to the foregoing test methods.

RESULTS

| Stage in Process | Dispersibility |
|---|---|
| After micronizing | 2½ |
| After micronizing and micropulverizing one-sixteenth inch holes | 9 |
| After micronizing and micropulverizing one thirty-second inch holes | 9 |
| After micronizing and hand sieving 14 mesh | 1½ |
| """""20 " | *7 |
| """""30 " | *7½ |
| Micropulverizing only one-thirty-second inch holes (bad specks) | 0 |

*Average of two determinations

Many equivalent modifications will become apparent to those skilled in the art from a reading of the above without a departure from the inventive concept.

I claim:

1. In a two step-process for preparing titanium dioxide pigment wherein the first step comprises subjecting the titanium dioxide pigment to fluid energy milling, the improvement wherein the second step comprises forcing the milled, dry pigment through a foraminous sheet having holes therein of from 0.25 to 2.5 mm. in diameter, whereby titanium dioxide pigment having increased dispersibility in plastic formulations is produced.

2. The process of claim 1 wherein said "forcing" is by mechanical screening devices.